US012577428B2

(12) United States Patent
Feringa et al.

(10) Patent No.: US 12,577,428 B2
(45) Date of Patent: Mar. 17, 2026

(54) BINDER POLYMER OBTAINABLE BY COPOLYMERIZING A MONOMER MIXTURE COMPRISING A VINYL MONOMER AND A BUTENOLIDE MONOMER

(71) Applicant: AKZO NOBEL COATINGS INTERNATIONAL B.V., Amsterdam (NL)

(72) Inventors: Bernard Lucas Feringa, Groningen (NL); Johannes George Hendrik Hermens, Groningen (NL); Keimpe Jan Van Den Berg, Arnhem (NL); Rogier Van Gemert, Arnhem (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 642 days.

(21) Appl. No.: 17/773,085

(22) PCT Filed: Oct. 30, 2020

(86) PCT No.: PCT/EP2020/080505
§ 371 (c)(1),
(2) Date: Apr. 29, 2022

(87) PCT Pub. No.: WO2021/084066
PCT Pub. Date: May 6, 2021

(65) Prior Publication Data

US 2024/0117212 A1 Apr. 11, 2024

(30) Foreign Application Priority Data

Oct. 31, 2019 (EP) .................................... 19206598
Feb. 6, 2020 (EP) .................................... 20155788

(51) Int. Cl.

| | |
|---|---|
| ***C09D 137/00*** | (2006.01) |
| ***C08F 216/14*** | (2006.01) |
| ***C08F 218/10*** | (2006.01) |
| ***C08F 234/02*** | (2006.01) |
| ***C09D 5/02*** | (2006.01) |
| ***C09D 129/10*** | (2006.01) |
| ***C09D 131/02*** | (2006.01) |

(52) U.S. Cl.
CPC ...... *C09D 137/00* (2013.01); *C08F 216/1416* (2013.01); *C08F 218/10* (2013.01); *C08F 234/02* (2013.01); *C09D 5/022* (2013.01); *C09D 129/10* (2013.01); *C09D 131/02* (2013.01); *C08F 2800/20* (2013.01)

(58) Field of Classification Search
None
See application file for complete search history.

(56) References Cited

U.S. PATENT DOCUMENTS

2008/0161500 A1 7/2008 Stark et al.
2009/0191399 A1 7/2009 Moore et al.
2014/0243469 A1 8/2014 Billiani et al.

FOREIGN PATENT DOCUMENTS

JP 2003335826 A 11/2003
WO WO 2007/031490 A1 * 3/2007
WO WO2009/080599 A1 7/2009
WO WO 2017/211852 A1 * 12/2017

OTHER PUBLICATIONS

"Office Action," for Chinese Patent Application No. 202080071310.6 mailed Aug. 10, 2022 (6 pages) with English Summary.
English Translation of JP2003335826A.
Johannes Cornelis De Jong, Asymmetric Diels-Alder Reactions with 5-menthyloxy-2(5H)-Furanones, University of Groningen, 2006, pp. 1-136.
V.V. Poskonin et al., Studies on Substituted Butane- and Butenolides: XIV, . . . , Russian Journal of Organic Chemistry, vol. 35, No. 5, 1999, pp. 721-726.
Ben L. Feringa et al., Anomalous Ozonolysis Products in the Addition of Singlet Oxygen to Methoxymethylfurans, Tetrahedron Letters, vol. 22, No. 15, 1981, pp. 1447-1452.
Ben L. Feringa et al., Asymetric 1,4-Additions to 5-Alkoxy-2(5H)-Furanomes, An Efficiens Synthesis . . . , Tetrahedron Letters, vol. 44, No. 23, pp. 7213-7222.
Ben L. Feringa, Photo-Oxidation of Furans, Recueil des Travaux Chimiques des Pays-Bas, 106/9, Sep. 1987, pp. 469-488.
European Search Report of Corresponding Application No. EP19206598.5, dated Apr. 20, 2020.
International Search Report and Written Opinion of Corresponding International Application No. PCT/EP2020/080505, mailed Nov. 16, 2020.

* cited by examiner

*Primary Examiner* — Tae H Yoon
(74) *Attorney, Agent, or Firm* — Pauly, DeVries Smith & Deffner LLC

(57) ABSTRACT

The invention relates to a binder polymer obtainable by copolymerizing a monomer mixture comprising a vinyl monomer M1 and a butenolide monomer M2, wherein the vinyl monomer M1 is a vinyl ether, a vinyl ester, or a combination thereof, and the butenolide monomer M2 is a 5-alkoxy-2(5H)-furanone. The invention further relates to a coating composition comprising such binder polymer and to a substrate coated with a coating deposited from such coating composition.

13 Claims, No Drawings

BINDER POLYMER OBTAINABLE BY COPOLYMERIZING A MONOMER MIXTURE COMPRISING A VINYL MONOMER AND A BUTENOLIDE MONOMER

CROSS-REFERENCE TO RELATED APPLICATIONS

This application is a 35 U.S.C. § 371 national phase application of PCT Application No. PCT/EP2020/080505 (published as WO 2021/084066 A1), filed on Oct. 30, 2020, which claims the benefit of priority to EP application Ser. No. 19/206,598.5, filed Oct. 31, 2019 and EP application Ser. No. 20/155,788.1, filed on Feb. 6, 2020, each of which is incorporated herein by reference in its entirety.

FIELD OF THE INVENTION

The present invention relates to binder polymer obtainable by copolymerizing a monomer mixture comprising a vinyl monomer and a butenolide monomer, to a coating composition comprising such binder polymer, and to a substrate coated with a coating deposited from such coating composition.

BACKGROUND OF THE INVENTION

Polyacrylates or other addition polymers are widely used as film-forming polymers in paints and coatings. Film-forming polymers are also referred to as binder polymers since such polymers have the role to bind any particulate material such as color pigments and extender pigments together.

Polyacrylates or other addition polymers are typically prepared by radical polymerization of monomers with an ethylenically unsaturated group, such as an acrylic, methacrylic, or vinyl group. Examples of such monomers include acrylic acid, methacrylic acid, alkyl esters of (meth)acrylic acid, styrene, alkyl-substituted styrene, vinyl esters, and vinyl ethers. The monomers are usually prepared from petrochemical raw materials.

There is an increasing demand for chemical products prepared from renewable feedstock. Binder polymers at least partly prepared from renewable feedstock are known in the art. Alkyd resins for example comprise a relatively high content of fatty acids obtained from vegetable oil.

In WO 2009/080599 is disclosed a process for preparing polymerizable ethylenically unsaturated macromonomers from vegetable oil that can be used to prepare an addition polymer for use in coating compositions.

Butenolides are ethylenically unsaturated furanoic compounds that can be prepared from carbohydrates, i.e. a renewable feedstock. Carbohydrate feedstock such as starch, cellulose or carbohydrate-containing bio-waste can be converted into furfural, hydroxymethylfurfural, or related furan derivatives by dehydration and then oxidized into lactones or other butenolides. Preparation of butenolides is for example described in Chapter II of J.C. de Jong, Asymmetric Diels-Alder reactions with 5-menthyloxy-2(5H)-furanones, Thesis University of Groningen, 2006, accessible via https://www.rug.nl/research/portal/en/publications/asymmetric-dielsalder-reactions-with-5menthyloxy25hfuranones (f0ab6c00-8c6c-4ccc-90aa-3ef05f759fa4).html.

Poskonin et al. have disclosed in *Russian Journal of Organic Chemistry* 35 (1999) 721-726 copolymers prepared by radical polymerization of 4-alkoxy-2-butenolide (5-alkoxy-2(5H)-furanone) and styrene, methyl methacrylate, or vinyl acetate.

Use of such copolymers for synthesis of physiologically active substances is suggested.

There is a need for binder polymers that can be obtained from renewable feedstock.

SUMMARY OF THE INVENTION

It has now been found that if 5-alkoxy-2(5H)-furanones are copolymerized with specific vinyl monomers, copolymers can be prepared that can suitably be used as binder polymer in coating compositions.

Accordingly, the invention provides in a first aspect a binder polymer obtainable by copolymerizing a monomer mixture comprising a vinyl monomer M1 and a butenolide monomer M2, wherein the vinyl monomer M1 is a vinyl ether of general formula (I)

$$R^1—O—CH═CH_2; \quad (I)$$

a vinyl ester of general formula (II)

$$R^2—C(O)—O—CH═CH_2; \quad (II)$$

or a combination thereof, wherein each of $R^1$ and $R^2$ is, independently, an organic radical containing in the range of from 4 to 18 carbon atoms, and wherein the butenolide monomer M2 is a 5-alkoxy-2(5H)-furanone of general formula (III)

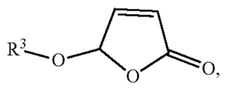

(III)

wherein $R^3$ is an alkyl radical containing in the range of from 1 to 12 carbon atoms.

The binder polymer has been found to provide a tack-free coating film with good hardness properties if applied to a substrate and allowed to dry.

The binder polymer has a polymer backbone with acetal functionality, which advantageously provides possibilities for crosslinking.

Accordingly, the invention provides in a second aspect a coating composition comprising a binder polymer according to the first aspect of the invention.

In a final aspect, the invention provides a substrate coated with a coating deposited from a coating composition according to the second aspect of the invention.

DETAILED DESCRIPTION OF THE INVENTION

The binder polymer according to the invention is obtainable by copolymerizing a monomer mixture comprising a vinyl monomer M1 and a butenolide monomer M2.

Vinyl monomer M1 is a vinyl ether of general formula (I) or a vinyl ester of general formula (II) or a combination thereof. General formula (I) is $$R^1—O—CH═CH_2 \quad (I)$$

and general formula (II) is $$R^2—C(O)—O—CH═CH_2 \quad (II)$$

wherein each of $R^1$ and $R^2$ is, independently, an organic radical containing in the range of from 4 to 18 carbon atoms, preferably in the range of from 4 to 12 carbon atoms. Each of $R^1$ and $R^2$ may be an aromatic or aliphatic organic radical and may be branched or unbranched. Preferably, each of $R^1$ and $R^2$ is a hydrocarbon radical, optionally substituted with an OH group, more preferably a branched or unbranched aliphatic hydrocarbon radical, optionally substituted with an OH group. Preferably, vinyl monomer M1 is vinyl neodecanoate, vinyl neononanoate, vinyl decanoate, n-butyl vinyl ether, iso-butyl vinyl ether, cyclohexyl vinyl ether, phenyl vinyl ether, 2-ethylhexyl vinyl ether, n-dodecyl vinyl ether, octadecyl vinyl ether, 4-hydroxybutyl vinyl ether, or a mixture of two or more thereof.

In one embodiment, vinyl monomer M1 is vinyl neodecanoate or a mixture of vinyl neodecanoate and vinyl neononanoate.

In another embodiment, vinyl monomer M1 is a vinyl ether, preferably n-butyl vinyl ether, iso-butyl vinyl ether, cyclohexyl vinyl ether, phenyl vinyl ether, 2-ethylhexyl vinyl ether, n-dodecyl vinyl ether, 4-hydroxybutyl vinyl ether, or a mixture of two or more thereof. It has been found that vinyl monomer M1 of general formula (I), i.e. vinyl ethers, copolymerize at a higher reaction rate with butenolide monomer M2 compared to vinyl monomer M1 of general formula (II), i.e. vinyl esters.

Butenolide monomer M2 is a 5-alkoxy-2(5H)-furanone of general formula (III)

(III)

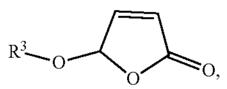

wherein $R^3$ is an alkyl radical containing in the range of from 1 to 12 carbon atoms. The alkyl radical may be branched, unbranched, linear, or cyclic. Examples of suitable alkyl radials are methyl, ethyl, n-propyl, isopropyl, n-butyl, tert-butyl, sec-butyl, isobutyl, hexyl, menthyl (2-isopropyl-5-methylcyclohexan-1-yl). Preferably, the alkyl radical has in the range of from 1 to 6 carbon atoms, more preferably of from 1 to 4 carbon atoms. A particularly preferred monomer M2 is 5-methoxyfuran-2(5H)-one ($R^3$ is $CH^3$).

The monomer mixture may have any suitable molar ratio of vinyl monomer M1 to butenolide monomer M2. Preferably, the molar ratio of vinyl monomer M1 to butenolide monomer M2 is in the range of from 1:10 to 10:1, more preferably of from 1:5 to 5:1, even more preferably of from 1:3 to 3:1, still more preferably of from 1:2 to 2:1, or even of from 1:1.5 to 1.5:1 .

The monomer mixture may comprise further ethylenically unsaturated monomers other than vinyl monomers M1 and butenolide monomers M2 that can be copolymerized by radical polymerization. Examples of such further monomers are acrylic acid, methacrylic acid, alkyl esters of (meth) acrylic acid, styrene, methylene malonates, itaconic acid, vinyl acetate, divinyl ethers such as ethyleneglycol divinyl ether, diethyleneglycol divinyl ether, triethyleneglycol divinyl ether, 1,4-butanediol divinyl ether, and trivinyl ethers such as trimethylolpropane trivinyl ether. The presence of divinyl ethers in the monomer mixture provides a binder polymer with crosslinking functional groups.

Preferably, the monomer mixture comprises less than 50 mole % of further ethylenically unsaturated monomers, more preferably less than 30 mole %, even more preferably less than 20 mole %, or even less than 10 mole %. In one embodiment, the monomer mixture comprises in the range of from 1 to 50 mole % of further ethylenically unsaturated monomers, preferably of from 2 to 30 mole %, more preferably of from 5 to 20 mole%.

In another embodiment, the monomer mixture is free of further ethylenically unsaturated monomers.

The copolymerizing is a radical polymerization process. Conditions that allow the monomers to copolymerize into an addition polymer by radical polymerization are well-known in the art. Suitable conditions typically include the presence of an initiator.

The co-polymerization may be carried out in an organic solvent (solvent polymerization). In solvent polymerization, the monomer mixture is dissolved in a suitable organic solvent, heated to the desired reaction temperature and a suitable initiator is added in a suitable amount. Typically, the temperature during solvent polymerization is in the range of from 50° C. to 180° C., preferably of from 70° C. to 160° C. It will be appreciated that the optimum polymerization temperature will depend on the decomposition temperature of the initiator used and the boiling temperature of the any monomers at the pressure at which the polymerization is carried out. The monomer mixture may be dissolved in any suitable solvent during the copolymerization. Suitable organic solvents are solvents in which all monomers in the monomer mixture and the resulting copolymer dissolve at polymerization conditions. Preferably, the organic solvent is an oxygenated organic solvent such as for example an alcohol, glycol ether, glycol ester, alkyl acetate, ketone, ester, or glycol ether/ester. More preferably, the solvent is a glycol ether or an alkyl acetate. 1-Methoxy-2-propanol and butyl acetate are particularly preferred solvents.

Alternatively, the copolymerization may be carried out as an emulsion polymerization process wherein monomers are emulsified in an aqueous phase and then copolymerized. Emulsion polymerization is typically may be carried out at a temperature in the range of from 15° C. to 90° C.

Any suitable initiator may be used. Suitable initiators are known in the art and include organic peroxides and azo initiators. Examples of azo initiators include azobisisobutyronitrile (AIBN) and 2,2'-azodi(2-methylbutyronitrile) (AMBN). Examples of suitable organic peroxides include tert-butyl peroxy-3,5,5-trimethylhexanoate, benzoyl peroxide, lauroyl peroxide, di-t-butyl peroxide, acetyl peroxide, t-butyl peroxy 2-ethylhexyl carbonate, t-butyl peroxy octanoate, t-amyl peroxy octanoate, and t-butyl peroxy benzoate. The initiator may be added in any suitable amount, typically up to 6 mole % based on the total moles of ethylenically unsaturated monomers, preferably in the range of from 1 to 4 mole %. The total amount of initiator may be added in two or three steps, i.e. a first amount at the start of the polymerization and a further amount during the polymerization reaction.

Optionally, a chain transfer agent is used during polymerization. Any suitable chain transfer agent may be used in a suitable amount. Suitable chain transfer agents are known in the art and include methyl mercaptopropionate, 1-dodecanethiol, 1-octanethiol, thioglycolic acid, 2-hydroxy-1-ethanethiol, and butenediol.

The copolymerization may be carried out batch-wise, i.e. by dosing all monomers and initiator at the start of the polymerization, or by gradually dosing part of the monomers and/or initiator during copolymerization, i.e. at so-called starve-fed conditions.

It has been found that the copolymer thus-obtained has properties that makes it suitable to be used as binder polymer in coating compositions. The binder polymer has a relatively high content of butenolide, a component that can be obtained from renewable feedstock. In particular, a binder polymer with a glass transition temperature in the range of from +5° C. to +80° C., as measured by differential scanning calorimetry (DSC) according ISO 11357-2 using a heating rate of 20 K/min, can be obtained. A further advantageous property of the binder polymer is that it has a polymer backbone with acetal functionality (at the butenolide monomer). Such acetal group can be used for crosslinking, for example with a hydroxyl or thiol functional crosslinker or with a polymer with hydroxyl or thiol functionality.

Accordingly, the invention provides a coating composition comprising the binder polymer obtainable by copolymerizing a monomer mixture comprising a vinyl monomer M1 and a butenolide monomer M2 as specified above.

The coating composition may be a solventborne or waterborne liquid coating composition, or a powder coating composition, preferably a liquid coating composition, more preferably a waterborne liquid coating composition wherein the binder polymer is emulsified in an aqueous liquid phase.

The coating composition may comprise further ingredients commonly used in coating compositions such as color pigments, extender pigments, coalescing solvents, and one or more additives such as for example surfactants, defoaming agents, thickeners, leveling agents, and biocides.

In a final aspect, the invention relates to a substrate coated with a coating deposited from a coating composition according to the invention. The substrate may be any suitable substrate, such as for example wood, polymer, composite, metal or mineral substrate. The substrate may be a primed or bare substrate.

The binder polymers and coating compositions of the present disclosure are further illustrated by means of the following non-limiting examples.

EXAMPLES

The following vinyl ester and vinyl ether monomers were used:

| | |
|---|---|
| vinyl neodecanoate (ex. Hexion) | VeoVa 10 |
| vinyl neononanoate (ex. Hexion) | VeoVa 9 |
| 4-hydroxybutyl vinyl ether | C4—OH vinyl ether |
| n-dodecyl vinyl ether | C12 vinyl ether |
| vinyl acetate | VAc |

The following other ethylenically unsaturated monomers were used:

| | |
|---|---|
| butylacrylate | BA |
| methylmethacrylate | MMA |
| styrene | STY |

The following butenolide monomers were used:

| | |
|---|---|
| 5-methoxy-2(5H)-furanone | 5-methoxy |
| 5-menthoxy-2(5H)-furanone | 5-menthoxy |
| 5-methyl-5-methoxy-2(5H)-furanone | 5-methyl, 5-methoxy |
| 5-hydroxy-2(5H)-furanone | 5-hydroxy |
| 2(5H)-furanone | |
| 5-hexyloxy-2(5H)-furanone | 5-hexyloxy |

The following solvents were used:

| | |
|---|---|
| butyl acetate | BuAc |
| 1-methoxy-2-propanol (Dowanol ™ PM) | DowPM |

The following initiators were used:

| | |
|---|---|
| 2,2'-azodi(2-methylbutyronitrile) | AMBM |
| t-butyl peroxy-3,5,5-trimethylhexanoate | T42S |

Example 1—Binder Polymers from Vinyl Ester or Vinyl Ether and Butenolide

Binder polymers were prepared by charging butenolide monomer and solvent in a three-neck round-bottom flask equipped with a reflux condenser. The mixture was heated to a temperature of 125° C. and vinyl monomer and t-butyl peroxy-3,5,5-trimethylhexanoate (Trigonox 42S, ex. Nouryon) in further solvent was dosed in two hours whilst keeping the temperature at 125° C. under reflux conditions under a nitrogen blanket. Some further initiator was then added, and the reaction continued for one hour; then still further initiator was added and the reaction continued for another hour. The reaction mixture was cooled to room temperature. The calculated solids content (weight of monomers and initiator based on total weight of monomers, initiator, and solvent) was 43 wt %.

Different binder polymers were prepared using different monomers. Binder polymers 1 to 8 are binder polymers according to the invention; binder polymers A to D are comparison binder polymers.

The solids content of the resulting polymer solutions was determined in accordance with ISO 3251 with an initial sample mass of 1.0 g, test duration of 60 minutes, at a temperature of 125° C. The monomer conversion was calculated based on the measured solids content. Remaining monomers evaporate under the test conditions, whilst any polymer formed does not evaporate.

Solvent was evaporated from the polymer solutions obtained in a rotary evaporator (rotavapor) under reduced pressure (50 mbar), at 80° C. The thus-obtained samples were subjected to $^1$H NMR spectroscopy. The $^1$H NMR spectrum in combination with the polymer content of the polymer solution (from the solids content determination) gives a good indication of the conversion of specific monomers.

For some of the binder polymers, the number average and weight average molecular weights were determined using gel permeation chromatography (GPC) with tetrahydrofuran (THF) (+1% acetic acid) as eluent (1 ml/min) on a styrene-divinylbenzene column using polystyrene standards for calibration.

In Table 1 is shown for the different binder polymers prepared, the type and molar ratio of monomers used, and the solvent and initiator used.

Example 2—Binder Polymers from Other Ethylenically Unsaturated Monomers and butenolide (comparison)

Comparison binder polymers E and F were prepared as described in Example 1, using 5-methoxy-2(5H)-furanone as butenolide monomer and ethylenically unsaturated monomers other than vinyl monomers M1 as copolymers. Butylacetate was used as solvent and Trigonox 42S as initiator. In Table 2 is shown the type and ratio of monomers used.

In Table 3 is shown for binder polymers 1 to 8 (inventive) and for binder polymers A to F (comparison): the monomer conversion; the solids content of the binder polymer solution prepared; and observations on monomer built-in from the

$^1$H-NMR spectra. The number average and weight average molecular weights ($M_n$ and $M_w$; both in g/mole) and the polydispersity index (PDI), i.e. $M_n/M_w$, is given for binder polymers 1 to 5, E and F.

TABLE 1

Example 1 - of binder polymers (inventive and comparitive)

| | vinyl monomer | butenolide monomer | Molar ratio vinyl:butenolide | solvent | initiator |
|---|---|---|---|---|---|
| 1 | VeoVa 10 | 5-methoxy | 1:1 | DowPM | T42S |
| 2 | VeoVa 10 | 5-methoxy[a] | 1:1 | DowPM | T42S |
| 3 | VeoVa 10/9 (1:1) | 5-methoxy | 1:1 | DowPM | T42S |
| 4 | VeoVa 10 | 5-methoxy | 1.1:1 | DowPM | T42S |
| 5 | C12 vinyl ether | 5-methoxy | 1:1 | DowPM | T42S |
| 6 | C12 vinyl ether | 5-methoxy | 1:1 | BuAc | T42S |
| 7 | C4—OH vinyl ether | 5-methoxy | 1.:1 | DowPM | T42S |
| 8 | VeoVa 10 | 5-menthyloxy | 1:1 | DowPM | T42S |
| A [b] | VAc | 5-methoxy | 1.1:1 | BuAc | AMBN |
| B | VeoVa 10 | 5-methyl, 5-methoxy | 1:1 | DowPM | T42S |
| C | C12 vinyl ether | 5-methyl, 5-methoxy | 1:1 | DowPM | T42S |
| D | VeoVa 10 | 5-hydroxy | 1:1 | DowPM | T42S |

[a]monomer purified to 98% purity.
[b] polymerization carried out at 80° C.

TABLE 2

Example 2 - Preparation of comparison binder polymers

| | non-butenolide monomers | butenolide monomer | molar ratio | solvent | initiator |
|---|---|---|---|---|---|
| E | BA/MMA | 5-methoxy | BA/MMA/butenolide 9/23/13 | BuAc | T42S |
| F | BA/STY | 5-methoxy | BA/STY/butenolide 6/23/13 | BuAc | T42S |

TABLE 3

Characteristics of binder polymers prepared in Example 1 and 2

| | solids content (wt %) | conversion (wt %) | $M_n$ | $M_w$ | PDI | built-in of monomers[c] |
|---|---|---|---|---|---|---|
| 1 | 41.6 | 96.1 | 1,074 | 2,230 | 2.1 | butenolide built-in |
| 2 | 43.2 | 99.7 | 1,020 | 1,920 | 2.0 | butenolide built-in |
| 3 | 40.8 | 95.4 | | | | butenolide built-in |
| 4 | 41.8 | 93.2 | 1,098 | 2,462 | 2.2 | butenolide built-in |
| 5 | 34.0 | 76.6 | 1,047 | 2,770 | 2.6 | butenolide built-in |
| 6 | 34.7 | 78.1 | | | | butenolide built-in |
| 7 | 29.9 | 83.0 | | | | butenolide built-in |
| 8 | 25.8 | 56.9 | | | | most butenolide built-in |
| A | 7.9 | 22 | | | | unreacted vinyl and butenolide monomers visible in NMR |
| B | 12.6 | 28.3 | | | | unreacted vinyl and butenolide monomers in 1:1 ratio |
| C | 18.0 | 39.5 | | | | unreacted vinyl and butenolide monomers in 3:7 ratio |
| D | 7.3 | 16.4 | | | | Unreacted vinyl monomer visible; butenolide monomer seems to have decomposed |
| E | 32.9 | 70.6 | 3,412 | 9,346 | 2.7 | butenolide not copolymerized |
| F | 32.6 | 62.2 | 4,647 | 10,384 | 2.2 | butenolide not copolymerized |

[c]Based on $^1$H-NMR of polymer solution after evaporation of solvent.

Example 3—Preparation of Coating

A 200 μm wet film of binder polymer solution no. 3 was drawn on a glass plate using a drawing bar. The wet film was allowed to dry at 23° C. and 50% relative humidity for 7 days. A tack-free, transparent coating was obtained within 4 hours. Pendulum hardness (Persoz hardness) after two weeks storage at 23° C. and 50% relative humidity was determined according to ISO 1522. The time for the amplitude of the pendulum to decrease from 12 to 4 degrees was 60 seconds.

This example shows that the binder polymer film forms and can form a coating that is tack-free and has acceptable hardness for many coating applications.

Example 4—Reaction Kinetics for Different Monomer Combinations

The reaction kinetics (polymerization rate constant and maximum conversion) for different combinations of vinyl monomer and butanolide monomer were determined by means of [1] H-NMR spectroscopy as follows.

To a 4 mL vial with screwcap with septum were added 2 mmol of a vinyl monomer and 2 mmol of a butenolide monomer, 1 mL 1DowPM as solvent and 1 mmol 1,3,5- trimethoxybenzene as internal standard. The mixture was heated to 120° C. and 30 mg T42S was added as initiator. The mixture was refluxed for 2 to 4 hours. At intervals of 5 minutes, a sample of 50 μL was taken and flash frozen to stop polymerization. The absolute concentration of monomers was determined by $^1$ H-NMR spectroscopy using $^1$H-NMR shifts specific for each monomer. From the decrease of monomer concentration over time, the overall polymerization rate constant (in $s^{-1}$) and the maximum monomer conversion (%) achieved were determined. The results are given in Table 4.

TABLE 4 reaction kinetics of polymerization for different monomer combinations

| | monomers | | overall polymerization rate | maximum |
|---|---|---|---|---|
| | vinyl monomer | butanolide monomer | constant ($s^{-1}$) | conversion (%) |
| G* | C12 vinyl ether | 2(5H)-furanone | $3.10^{-4}$ | 58 |
| H* | VeoVa 10 | 2(5H)-furanone | $8.10^{-5}$ | 37 |
| 9 | C12 vinyl ether | 5-methoxy | $1.4.10^{-3}$ | 95 |
| 10 | VeoVa 10 | 5-methoxy | $6.10^{-4}$ | 100 |
| 11 | C12 vinyl ether | 5-hexyloxy | $2.1.10^{-3}$ | 100 |
| 12 | VeoVa 10 | 5-hexyloxy | $4.10^{-5}$ | 90 |
| 13 | C12 vinyl ether | 5-menthoxy | $1.1.10^{-3}$ | 100 |
| 14 | VeoVa 10 | 5-menthoxy | $3.10^{-4}$ | 90 |

*comparison example

In sample G, more vinyl monomer than butanolide monomer was built into the polymer.

This example shows that the 5-alkoxy-2(H)-furanones polymerize with vinyl monomers of general formula (I) at a higher polymerization rate compared to 2(5H)-furanone. Moreover, higher monomer conversion and better built-in of butanolide monomer is achieved.

The invention claimed is:

1. A binder polymer obtained by copolymerizing a monomer mixture comprising a vinyl monomer M1 and a butenolide monomer M2, wherein the vinyl monomer M1 is vinyl neodecanoate or a mixture of vinyl neodecanoate and vinyl neononanoate, and wherein the butenolide monomer M2 is a 5-alkoxy-2 (5H)-furanone of general formula (III)

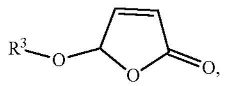

(III)

wherein $R^3$ is an alkyl radical containing from 1 to 12 carbon atoms;

wherein the monomer mixture comprises the vinyl monomer M1 and the butenolide monomer M2 in a molar ratio in the range of approximately 1:2 to 2:1;

wherein the binder polymer has a weight average molecular weight in the range of 1,900 and 2,800; and wherein the binder polymer has a polydispersity index in the range of 2.0 to 2.6.

2. The binder polymer according to claim 1, wherein $R^3$ is an alkyl radical containing from 1 to 6 carbon atoms.

3. The binder polymer according to claim 2, wherein the butenolide monomer M2 is 5-methoxy-2(5H)-furanone.

4. The binder polymer according to claim 1, wherein the monomer mixture comprises in the range of from 1 to 50 mole % of further ethylenically unsaturated monomers that are not vinyl monomers M1 or butenolide monomers M2.

5. The binder polymer according to claim 1, wherein the monomer mixture is free of ethylenically unsaturated monomers that are not vinyl monomers M1 or butenolide monomers M2.

6. A coating composition comprising a binder polymer according to claim 1.

7. The coating composition according to claim 6, wherein the coating composition is an aqueous liquid coating composition comprising the binder polymer emulsified in an aqueous phase.

8. A substrate coated with the coating composition according to claim 6.

9. A binder polymer obtained by copolymerizing a monomer mixture comprising a vinyl monomer M1 and a butenolide monomer M2 and in the range of from 1 to 50 mole % of further ethylenically unsaturated monomers that are not vinyl monomers M1 or butenolide monomers M2, wherein the vinyl monomer M1 is:

a vinyl ether of general formula (I)

$R^1$—O—CH═$CH_2$ (I), a vinyl ester of general formula (II)

$R^2$—C(O)—O—CH═$CH_2$ (II), or a combination thereof, wherein each of $R^1$ and $R^2$ is, independently, an organic radical containing from 4 to 18 carbon atoms, and wherein the butenolide monomer M2 is a 5-alkoxy-2(5H)-furanone of general formula (III)

(III)

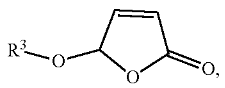

wherein $R^3$ is an alkyl radical containing from 1 to 12 carbon atoms;

wherein the monomer mixture comprises the vinyl monomer M1 and the butenolide monomer M2 in a molar ratio in the range of approximately 1:2 to 2:1;

wherein the binder polymer has a weight average molecular weight in the range of 1,900 and 2,800; and wherein the binder polymer has a polydispersity index in the range of 2.0 to 2.6.

10. A method of making a binder polymer by copolymerizing a monomer mixture comprising a vinyl monomer M1 and a butenolide monomer M2, wherein the vinyl monomer M1 is:

a vinyl ether of general formula (I)

$R^1$—O—CH═$CH_2$ (I), a vinyl ester of general formula (II)

$R^2$—C(O)—O—CH═$CH_2$ (II), or a combination thereof, wherein each of $R^1$ and $R^2$ is, independently, an organic radical containing from 4 to 18 carbon atoms, and wherein the butenolide monomer M2 is a 5-alkoxy-2(5H)-furanone of general formula (III)

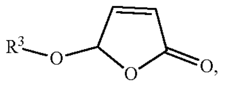

(III)

wherein $R^3$ is an alkyl radical containing from 1 to 12 carbon atoms;

wherein the monomer mixture comprises the vinyl monomer M1 and the butenolide monomer M2 in a molar ratio in the range of approximately 1:2 to 2:1;

wherein the binder polymer has a weight average molecular weight in the range of 1,900 and 2,800; and wherein the binder polymer has a polydispersity index in the range of 2.0 to 2.6.

11. The method of claim 10, wherein each of $R^1$ and $R^2$ is, independently, a hydrocarbon radical containing 4 to 12 carbon atoms, optionally substituted with an OH group.

12. The method of claim 10, wherein vinyl monomer M1 is a vinyl ether of general formula (I).

13. The method of claim 12, wherein vinyl monomer M1 is n-butyl vinyl ether, iso-butyl vinyl ether, cyclohexyl vinyl ether, phenyl vinyl ether, 2-ethylhexyl vinyl ether, n-dodecyl vinyl ether, 4-hydroxybutyl vinyl ether, or a mixture of two or more thereof.

* * * * *